Figure 1:
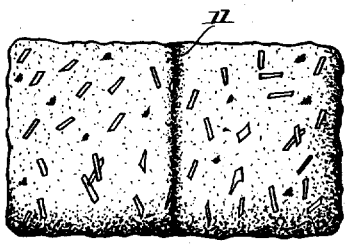

June 3, 1924.

Re. 15,851

C. Y. GARRETT

FIRE KINDLER

Original Filed Oct. 29, 1923

Inventor

C. Y. Garrett.

By Cushman, Darby & Cushman

Attorneys

Reissued June 3, 1924. Re. 15,851

UNITED STATES PATENT OFFICE.

CLARENCE Y. GARRETT, OF FOUNTAIN INN, SOUTH CAROLINA.

FIRE KINDLER.

Original No. 1,484,202, dated February 19, 1924, Serial No. 671,574, filed October 29, 1923. Application for reissue filed May 1, 1924. Serial No. 710,460.

*To all whom it may concern:*

Be it known that I, CLARENCE Y. GARRETT, a citizen of the United States, residing at Fountain Inn, in the county of Greenville and State of South Carolina, have invented new and useful Improvements in Fire Kindlers, of which the following is a specification.

The present invention relates to fire kindlers, and has as its object the provision of an article which may be manufactured and sold at comparatively inconsiderable expense, and which will produce a flame adapted to kindle fires in stoves, fire places, and for other uses.

A further object of the invention is to furnish an article which may be conveniently handled, and which for this reason is superior to ordinary wood, such as is generally employed for this purpose.

To be satisfactory, an article of this character must produce a comparatively long flame and a substantially small amount of material must be able to sustain the flame for an extended period, in order that coal may be ignited. I am aware that fire kindlers are old and well known. For instance, it has been proposed to construct a kindler by treating kindling wood with resin to expel the air and moisture. The objection to such an article as this is that it is comparatively inconvenient to handle, due to the fact that the pieces are ordinarily of considerable size. To avoid this objection it has also been proposed to treat pieces of wood of approximately three inches in length and one inch in width; but pieces of this size do not produce a flame of sufficient length, due to the fact that it is difficult to thoroughly impregnate them with resin and also because the article is not of porous character enabling a draft to pass through the article to lengthen the flame.

Cakes or balls molded from saw-dust or the like, previously impregnated with resin or a similar substance have also been suggested; such kindlers have been unsuccessful, for the reason that the cake or brick is necessarily of very compact character due to the packing of the material, and hence the flame produced is very short.

Again, none of the types of kindlers referred to has been a commercial success, since they cannot be conveniently handled. The resin becomes sticky under high temperatures causing the cakes to adhere to one another, when packed, and, in use, tending to soil the hands or clothing, particularly in climates where the temperature is above 75 or 80 degrees.

The present invention has as its object to provide a kindler in the form of a compact brick or cake, which may be handled without annoyance to the user, due to the provision of a comparatively hard coating.

A further characteristic of the present invention is the extremely porous nature of the brick or cake, which enables the air to pass through the same and form a flame of sufficient length and intensity to ignite both anthracite and bituminous coal.

As a base for the kindler, it is preferable to employ pieces of wood or wood pulp of substantially uniform length thereby insuring a steady flame. Wood shavings averaging not less than ⅛ of an inch in length and of approximately the same width and thickness have been found to be suitable. By the terms "wood" or "wood pulp" as used in both the specification and claims, is meant any woody substance or wood-like material adapted to be formed into particles of the character set forth. This material is treated with resin or other carbonaceous material so as to thoroughly impregnate and coat the individual particles. In practice I have accomplished this result by mixing the resin and shavings and, afterwards, heating the mixture until the resin comes to a boil. By this procedure the individual particles are thoroughly coated and impregnated with the resin, which is not possible when comparatively large pieces of material are employed.

After this treatment the shavings or other material are removed and, while hot, moulded into cakes of suitable form and dimensions. The moulding operation should be performed without any substantial pressure in order to produce a cake of very porous character, and the resin, after drying, will cause the particles to adhere to one another.

In the accompanying drawings there is shown, by way of example, an embodiment of the invention.

Figure 2:
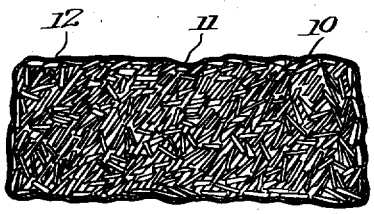

Figure 1 is a top plan view, and
Figure 2 is a longitudinal section.

Referring to the drawings, the body is, in the present instance, composed of wood shavings 10, which it will be noted are of substantially uniform length, insuring an even flame. The shavings, or such other particles of wood as may be used, are preferably obtained from seasoned pine, which produces a very satisfactory flame. This material is mixed with a suitable carbonaceous impregnating and coating substance, such as resin or a resinous material, and in order to obtain thorough impregnation, the mixture is heated until the resin is brought to a boiling point. As an example of a mixture which has been found extremely satisfactory for igniting bituminous coal, the relative percentages of shavings and resin may be as follows:

| | Per cent. |
|---|---|
| Shavings | 42 |
| Resin | 58 |

A satisfactory product for use with bituminous coal will be obtained if the percentages of resin and shavings are equal. As a fire kindler for use with extremely hard anthracite coal the relation may be:

| | Per cent. |
|---|---|
| Shavings | 25 |
| Resin | 75 |

For building a wood fire the following mixture will be found to give the desired result:

| | Per cent. |
|---|---|
| Shavings | 75 |
| Resin | 25 |

From the above examples of kindling cakes, it will be observed that no fixed relation between the amount of resin and shavings is necessary; the relation depends to a large extent upon the length of flame desired and the period the kindler must burn before the fire material is ignited.

After mixing the body material and the resin the mixture is heated until the resin comes to a boil and during the heating the mixture should be stirred so as to insure impregnation of the shavings or other wood particles employed.

Subsequently, when the resin comes to a boil, the wood shavings should be removed and poured into moulds while hot. The character of the moulds will depend upon the dimensions desired for the individual kindling cakes. In actual practice the cakes such as are shown in the drawings have been produced; these are approximately three inches in length, an inch and ½ in width, and an inch thick. When placed in a bed, such a cake will produce a cake over a foot long, and which will burn steadily for from ten to fifteen minutes.

When formed, the cakes are removed and permitted to dry; the resin coating the individual shavings will, after hardening, cause the cake to retain its shape. A very firm and solid article is thus obtained. By suitably forming the moulds a central depression 11 may be produced which will permit the cake to be readily divided, since in building a small fire an entire cake will not be required.

The cake will be found to be of a very porous nature, since the resin, after hardening, leaves numerous interstices between the individual shavings which permit a draft to pass through the article and to lengthen the flame. Unless the article is of porous character a flame of suitable length is not ordinarily obtainable. Furthermore, the use of comparatively small particles instead of a single strip or piece of wood, as has been heretofore proposed, renders possible thorough impregnation of the body material. That is to say, small particles of wood, such as shavings, can be thoroughly impregnated, whereas this cannot be readily accomplished with the larger pieces.

It will be understood that by the term "porous" as applied to the cake, is meant not the pores of the individual wood particles, but the interstices between the independent particles. These interstices are present even before the resin is melted, and increase in number as the resin begins to flow, due to the heat. Further, it will be understood that although I have described the base of the cake as consisting of "shavings," this term is used in its broadest sense to define particles of wood of substantially the length, width and thickness specified, and not necessarily particles obtained by shaving a larger piece of wood.

The article above described in warmer climates will become sticky, and, therefore, not entirely satisfactory for packing, storing or handling. The higher temperatures tend to melt the resin, causing the cakes to adhere to one another when packed, unless they are separately wrapped, and, when used, tending to soil the hands and clothing.

To avoid this difficulty the cakes after moulding and drying are provided with a coating 12 of a substance which will readily harden. This coating should, preferably, be moisture proof to keep the individual brick or cake dry and readily inflammable. Paraffin wax has been found to be entirely suitable for this purpose. The coating may be applied by dipping the cakes in wax and subsequently permitting the same to dry.

It will be understood by the term "cake" is meant any article having a fixed shape; the same may be round, square or of the shape indicated in the drawings.

I claim:

1. As an article of manufacture a fire kindler in the form of a porous cake, composed of wood shavings, the individual shavings being thoroughly impregnated and coated with a suitable resinous material.

2. As an article of manufacture a fire kindler in the form of a porous cake, composed of wood shavings, the individual shavings being thoroughly impregnated and coated with a suitable resinous material, and the cake having a moisture proof coating.

3. As an article of manufacture a fire kindler in the form of a porous cake, composed of wood shavings, the individual shavings being thoroughly impregnated and coated with resin.

4. As an article of manufacture a fire kindler in the form of a porous cake, composed of wood shavings, the individual shavings being thoroughly impregnated and coated with resin, and the cake having a moisture proof coating.

5. As an article of manufacture, a porous cake composed of particles of wood averaging not more than 1 inch, and not less than ⅛ of an inch in length, each particle being coated and impregnated with a suitable resinous material.

6. As an article of manufacture, a porous cake composed of particles of wood averaging not more than 1 inch, and not less than ⅛ of an inch in length, each particle being coated and impregnated with a suitable resinous material, and the cake having a comparatively hard coating.

7. As an article of manufacture, a porous cake composed of particles of wood averaging not more than 1 inch and not less than ⅛ of an inch in length, each particle being coated with resin, the resin serving to retain the particles together.

8. As an article of manufacture, a porous cake composed of particles of wood averaging not more than 1 inch and not less than ⅛ of an inch in length, each particle being coated with resin, the resin serving to retain the particles together and the cake having a paraffin coating.

9. The method of producing a fire kindler, which consists in forming comparatively small pieces of wood of substantially uniform length, impregnating and coating the pieces with resin by mixing the wood and resin and heating the same and then molding the particles into cakes to form a porous body.

10. The method of producing a fire kindler, which consists in forming comparatively small pieces of wood of substantially uniform length, impregnating and coating the pieces with resin by mixing the wood and resin and heating the same after mixing and then molding the particles into cakes to form a porous body.

11. The method of producing a fire kindler, which consists in forming comparatively small pieces of wood of substantially uniform length, impregnating and coating the pieces with resin by mixing the wood and resin and heating the same and then coating the cakes with paraffin.

12. The method of producing a fire kindler, which consists in forming comparatively small pieces of wood of substantially uniform length, impregnating and coating the pieces with a suitable carbonaceous material while the latter is heated and then molding the particles into porous cakes.

13. The method of producing a fire kindler which consists in forming comparatively small pieces of wood of substantially uniform length, impregnating and coating the pieces with a suitable carbonaceous material while the latter is heated, then molding the particles into porous cakes, and subsequently coating the cakes.

CLARENCE Y. GARRETT.